United States Patent [19]
Plum

[11] 3,882,599
[45] May 13, 1975

[54] PRUNING SHEARS
[76] Inventor: Raymond W. Plum, 1935 John St., Selma, Calif. 93662
[22] Filed: Dec. 19, 1973
[21] Appl. No.: 426,204

[52] U.S. Cl. .................................. 30/270; 30/271
[51] Int. Cl. ............................................ B26b 13/28
[58] Field of Search ............ 30/254, 266, 270, 271, 30/267

[56] References Cited
UNITED STATES PATENTS

| | | | |
|---|---|---|---|
| 624,175 | 5/1899 | Chapman | 30/266 X |
| 2,373,757 | 4/1945 | Hart | 30/271 |
| 3,262,202 | 7/1966 | Porzky | 30/271 |
| 3,740,846 | 6/1973 | Duffy | 30/267 |

FOREIGN PATENTS OR APPLICATIONS
589,843  7/1947  United Kingdom

Primary Examiner—Donald G. Kelly
Assistant Examiner—J. C. Peters

[57] ABSTRACT

Disclosed is a pair of pruning shears having frustroconical mating surfaces at the pivot to prevent elliptical wear of the pivot bore. The pivot bolt is threaded in one blade of the shears and held by a lock nut. The other blade has a frustroconical counterbore mated to a frustroconical washer which is held on the pivot bolt by a self locking nut. A bumper with a spring loaded plunger is mounted on one blade of the shears by blind rivets positioned to brake the other blade as the shears close. The blades are attached to the handles by bolts and bands are provided which encircle the handles at the point of attachment.

6 Claims, 5 Drawing Figures

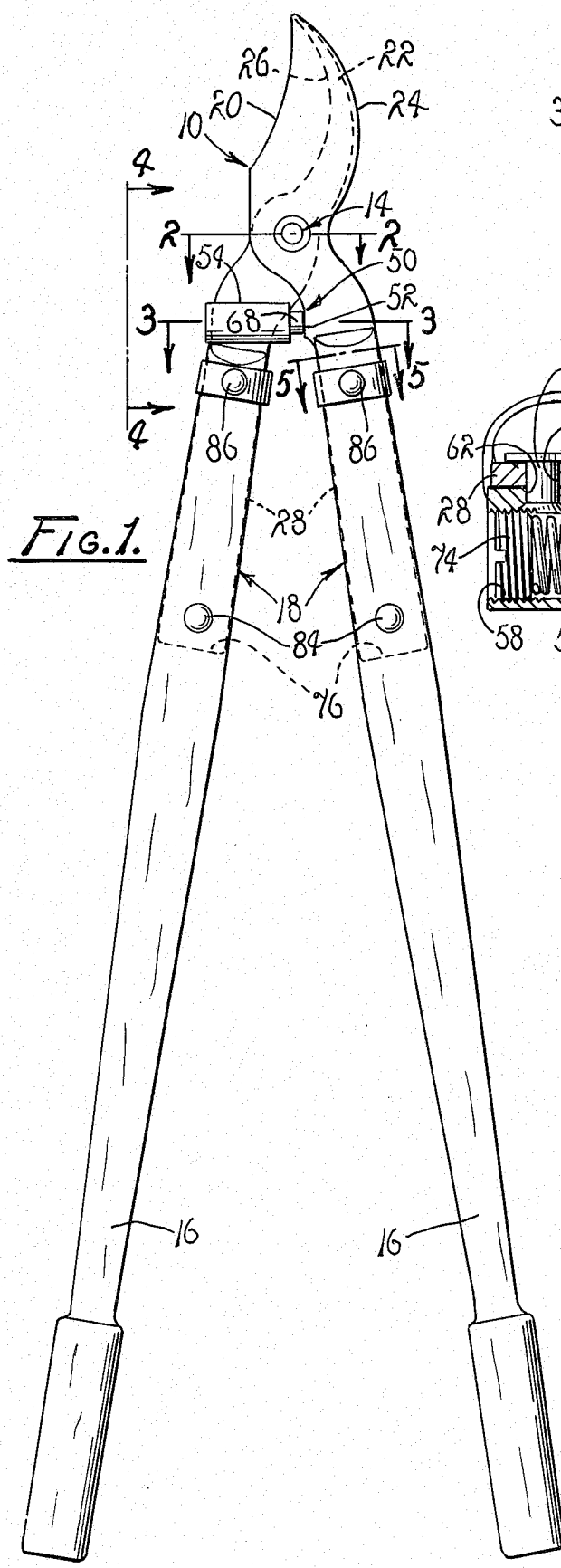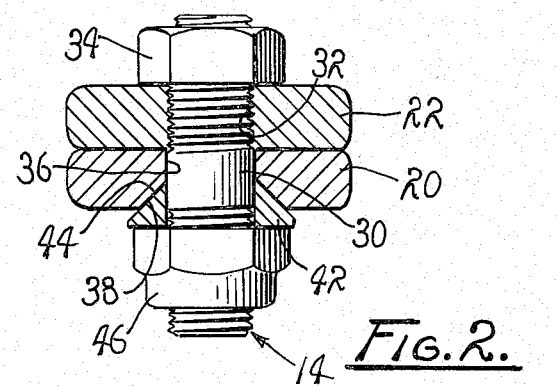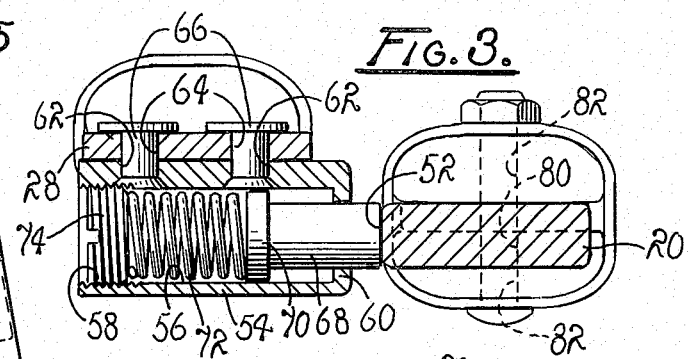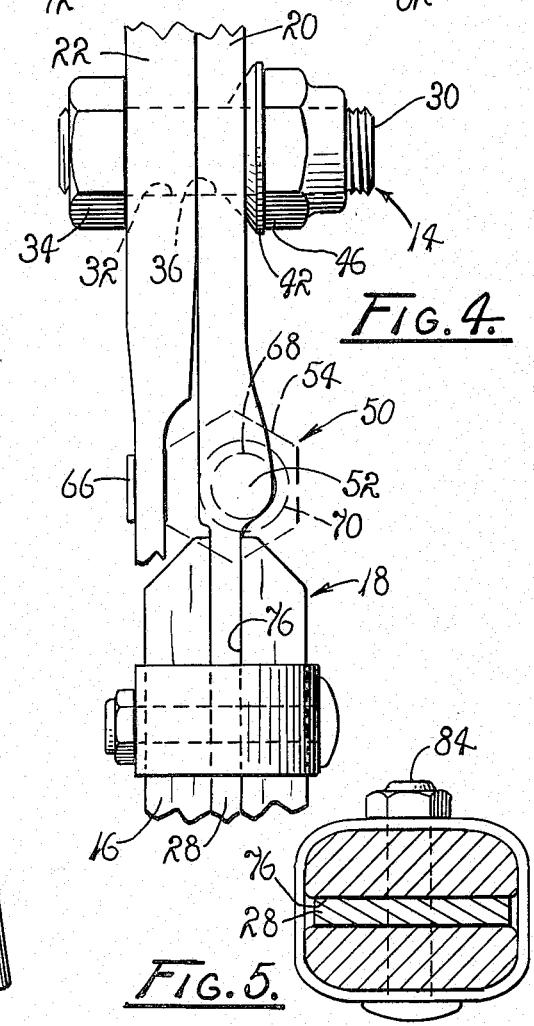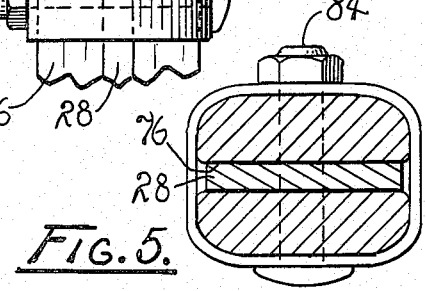

PRUNING SHEARS

BACKGROUND OF INVENTION

This invention relates generally to shears and more particularly to shears used for pruning trees.

Although pruning shears are an old and well known tool, there are still areas of improvement that are needed. When pruning shears are made for home use they do not require any special structure since the use to which they are subjected is not sufficiently abusive. On the other hand, when pruning shears are subjected to commercial use their structure is severely tested. In commercial usage pruning shears are used all day at an accelerated pace on heavier pruning work for several months continuously. To withstand this usage the shears must be of substantial structure. Even then a pair of shears can be rapidly worn out. The commercial shears presently in use have three principal areas of weakness. First, the repeated use in heavier pruning work causes the pivot bore to wear oblong or elliptical. When this wear becomes severe enough the blades of the shears shift as they are brought into cutting relationship and lose the ability to cut quickly and easily. They must then be discarded.

The second common point of failure is the bumper which relieves the shock as the cut is completed and the handles come together. If commercial shears are not equipped with an effective bumper, the handles are soon torn loose from the blades by the constant hammering together.

Finally, the point of connection between the blades and handles breaks loose after repeated use.

Thus a need exists for improved pruning shears less vulnerable to the failures described and still economical to manufacture and easy to use.

It is, therefore, a major object of my invention to provide improved pruning shears able to withstand the stresses of commercial pruning use for longer periods without failure.

It is also an important object of my invention to provide improved pruning shears of the type described which cost little, if any, more than presently known shears for commercial use.

Another important object of my invention is to provide pruning shears for commercial use which have increased strength at the points of likely failure.

Still a further object of my invention is to provide pruning shears for commercial use which are easier to use and perform better than presently known shears.

These and other objects and advantages of my invention will become more readily apparent from the following detailed description of a preferred embodiment and the accompanying drawings in which:

FIG. 1 is a side elevational view of my improved pruning shears;

FIG. 2 is a sectional view taken on 2—2 in FIG. 1;

FIG. 3 is a sectional view taken on 3—3 in FIG. 1;

FIG. 4 is a sectional view taken on 4—4 in FIG. 1; and

FIG. 5 is a sectional view taken on 5—5 in FIG. 1.

Referring now to the drawings and particularly FIG. 1 thereof, the numeral 10 designates generally my improved pruning shears. The shears 10 have a pair of steel blades 12 interconnected by a pivotal connection 14. A pair of wooden handles 16 are attached to the blades 12 by handle attachment means 18.

The blades 12 consist of a hook blade 20 and a shear blade 22. The hook blade 20 has a cutting edge 24 which meets a cutting edge 26 on the shear blade 22 when the blades are pivoted together about the pivotal connection 14 to which the handles 16 are connected. The handles 16 extend the length of the lever portions 28 so that a great mechanical advantage is provided the user in shearing a limb disposed between the cutting edges of the blades 12.

The pivotal connection 14 is, of course, the fulcrum through which this mechanical advantage operates and must withstand the resultant forces. Since constant shearing action of the blades 12 about the pivotal connection 14 tends to wear the pivot elliptically along a longitudinal azis substantially normal to the handles 16, I provide means to resist such wear. My pivoted connection 14 has a pivot bolt 30 with threads at each end and a smooth periphery in the center. The shear blade 22 has a tapped hole 32 into which one end of the pivot bolt 30 is threaded. The distal portion of the pivot bolt 30 projects from the hole 32 on the outside surface of the shear blade and a lock nut 34 is threaded on this distal portion to form a double nut lock holding the pivot bolt 30 in the shear blade 22.

The hook blade 20 has a bore 36 which receives the pivot bolt 30, and the pivot bolt is threaded and locked in tapped hole 32 of the shear blade 22 so that the portion having the smooth periphery is aligned with the bore. A frustroconical counterbore 38 is formed in the outer surface of the hook blade 20 with a bearing surface 40, and a frustroconical washer 42 is mounted on the outwardly extending portion of the pivot bolt 30 with a washer bearing surface 44 mated to the counterbore bearing surface 40. A self locking nut 46 is threaded on the outermost portion of the pivot bolt 30 at the hook blade end to hold the washer 42 in the counterbore 38 and the inner surfaces of hook blade 20 and shear blade 22 in close shearing contact. Thus assembled, it will be understood that the pivot bolt 30 moves with the shear blade 22 as does the washer 42, while the hook blade pivots on the smooth peripherial portion of the pivot bolt 30 with the counterbore bearing surface 40 pivoting on the washer bearing surface 44. This structure resists elongation of the bore 36 in the hook blade 20 by the pivot bolt 30 because of the frustroconical configuration of the mated bearing surfaces, and since the washer 42 has a portion projecting out of the counterbore 38, it can be tightened by nut 46 to move further into the counterbore and take up any slack created by wear of the coacting bearing surfaces.

To eliminate shock on closing of the blades in shear, a bumper 50 is mounted on the hook blade 20 and positioned to engage a stop 52 on the shear blade 22. The bumper 50 has a housing 54 with a longitudinal bore 56. The bore 56 has internal threads 58 in one end and an inwardly directed flange 60 in the other end. The pair of radially directed mounting holes 62 are provided in the periphery of the housing which align with mounting holes 64 in the hook blade 20. The housing is attached to the hook blade on the lever portion 28 by blind rivets 66 passed through the blade mounting holes 64 and the housing mounting holes 62.

The housing 54 is so positioned on the lever portion 28 of the hook blade that its longitudinal axis aligns with the stop 52 on the shear blade 20, and the inward flange end is positioned adjacent the stop when the blades are in their closed position. A plunger 68 is mounted in the bore 56 which projects outwardly through the inward flange 60 and engages the stop 52. The plunger has a collar 70 on its inner end which engages the inward flange 60 to hold the plunger in the bore.

The collar is sufficiently small in radius to pass through the threaded end of the bore so insertion of the plunger into the bore can be accomplished in that manner.

A compression spring 72 is placed in the bore 56 and clamped between the collar end of the plunger and a threaded lock screw 74 threaded into the threaded end of the bore. The spring 72 forces the outwardly projecting end of the plunger against the stop 52 and when the blades are brought to their closed position compresses to absorb the shock.

The configuration of the stop 52 is such that the outwardly projecting end of the plunger engages the stop surface at a right angle to assure good contact and eliminate wear. The right angle contact also assures that the plunger 68 is moved in the bore 56 axially rather than at a cocked angle which would cause uneven resistance and excessive wear. In addition, the bumper 50 is so positioned with respect to the stop 52 that the distal ends of the handles 16 never come so close together that the user's knuckles wrap, even when shorter handles such as 18 inch, are used.

The handles 16 has longitudinal slits 76 in their connecting ends 78 into which the lever portions 28 of the blades 12 are inserted. The handles each have two mounting holes 80 which align with handle holes 82 in the lever portions of the blades to pass mounting bolts 84. The mounting bolts 84 thus secure the connecting ends of the handles to the lever portions of the blades.

To prevent the handles 16 from splitting or breaking at the mounting holes 80, mounting bands 86 are provided which snuggly encircle the handles at the mounting holes 80 nearest the connecting ends. Since the handles tend to pivot about the mounting holes 80 further from the connecting ends, the holes nearest the connecting ends experience the greatest stress.

The mounting bands 86 have aligned band holes 88 which also pass the mounting bolts 84 and serve as washers as well as securing bands.

It will thus be understood that my improved shears incorporate features to prevent failure at their weak points. The pivot point 14 is protected from elongation of the hole by the mated frustroconical surfaces. The shock of closing the blades is absorbed by an easily assembled bumper 50, which can also be readily disassembled to permit removal of debris that interferes with its shock absorber action. And, the handles are banded to the lever portions 28 in a manner which is simple yet quite effective in preventing splitting at this junction.

I have, therefore, provided improved pruning shears fully capable of attaining the objects and providing the advantages heretofore attributed to them.

I claim:

1. Improved pruning shears comprising:
   a hook blade having a pivot bore intermediate a cutting end and a handle end;
   a shear blade having a pivot bore intermediate a cutting end and a handle end;
   a pivot stud affixed to a first of said blades and disposed to extend through the pivot bores of each of said blades when said blades are positioned with their adjacent surfaces face to face, ensuring relationship with their pivot holes aligned;
   a counterbore in said pivot bore of the other of said blades having a convex frustroconical bearing surface disposed with its smaller diameter toward said adjacent surface of said blade;
   a washer having a peripheral frustroconical bearing surface mated to said frustroconical counterbore surface and an axial thickness substantially greater than the axial depth of said counterbore;
   means connecting said washer to said pivot stud, said means including a center bore in said washer disposed to pass said pivot stud therethrough and having a bearing surface, a bearing surface on the periphery of said pivot stud where said pivot stud passes through said washer's center bore whereby said washer is free to move rotatably with respect to said pivot stud, and securing means interconnected with said stud adjacent said washer and disposed to hold said washer in said counterbore; and
   a pair of handles each connected to the handle end of one of said blades.

2. Improved pruning shears as described in claim 1, which further includes:
   a bumper mounted on said hook blade handle end and having a reciprocally movable, resiliently urged plunger therein; and
   a stop mounted on said shear blade and disposed to engage said bumper plunger at right angles and reciprocates said plunger axially.

3. Improved pruning shears as described in claim 1, which further includes:
   handle attachment means disposed to interconnect said handles to said handle ends of said blades, said handle attachment means including an annular band disposed about a proximal end of each of said handles and having a pair of diametrically opposed holes therein, lateral bores through the proximal ends of said handles and a pin disposed through each of said bores and said holes in said bands to secure said proximal ends of said handles to said handle ends of said blades.

4. Improved pruning shears as described in claim 2, which further includes:
   handle attachment means disposed to interconnect said handles to said handle ends of said blades, said handle attachment means including an annular band disposed about a proximal end of each of said handles and having a pair of diametrically opposed holes therein, lateral bores through the proximal ends of said handles and a pin disposed through each of said bores and said holes in said bands to secure said proximal ends of said handles to said handle ends of said blades.

5. Improved pruning shears as described in claim 2, in which:
   said bumper has a housing with an axial bore secured to one of said blades, said housing having a bore having a collared opening in one end and bore threads at the other;
   a plunger in said bore having a piston head on its inner end, and an outer end projecting through said collared opening; and spring means resiliently urging said piston outwardly in said bore to project the same through said collared opening; and a plug threaded in the other end of said bore and disposed to hold said spring in said bore.

6. Improved pruning shears as described in claim 2 in which:

said bumper has a housing with an axial bore secured to one of said blades, said housing having a bore having a collared opening in one end and bore threads at the other;

a plunger in said bore having a piston head on its inner end, and an outer end projecting through said collared opening; and spring means resiliently urging said piston outwardly in said bore to project the same through said collared opening;

a plug threaded in the other end of said bore and disposed to hold said spring in said bore; and handle attachment means disposed to interconnect said handles to said handle ends of said blades, said handle attachment means including an annular band disposed about a proximal end of each of said handles and having a pair of diametrically opposed holes therein, lateral bores through the proximal ends of said handles and a pin disposed through each of said bores and said holes in said bands to secure said proximal ends of said handles to said handle ends of said blades.

* * * * *